US009548542B2

(12) United States Patent
Ling

(10) Patent No.: US 9,548,542 B2
(45) Date of Patent: Jan. 17, 2017

(54) MILLIMETER WAVE SPATIAL CROSSBAR FOR A MILLIMETER-WAVE-CONNECTED DATA CENTER

(71) Applicant: Maxlinear, Inc., Carlsbad, CA (US)

(72) Inventor: Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 228 days.

(21) Appl. No.: 14/313,956

(22) Filed: Jun. 24, 2014

(65) Prior Publication Data

US 2014/0375528 A1 Dec. 25, 2014

Related U.S. Application Data

(60) Provisional application No. 61/838,667, filed on Jun. 24, 2013, provisional application No. 61/845,840, filed on Jul. 12, 2013.

(51) Int. Cl.

| | |
|---|---|
| ***H04B 7/00*** | (2006.01) |
| ***H01Q 15/02*** | (2006.01) |
| ***H01Q 19/17*** | (2006.01) |
| ***H01Q 25/00*** | (2006.01) |

(52) U.S. Cl.

CPC .............. *H01Q 15/02* (2013.01); *H01Q 19/17* (2013.01); *H01Q 25/007* (2013.01)

(58) Field of Classification Search

USPC .......... 455/41.1–41.3, 500, 63.1, 550.1, 561, 455/562.1, 575.1

See application file for complete search history.

(56) References Cited

U.S. PATENT DOCUMENTS

| | | | | |
|---|---|---|---|---|
| 2009/0028177 A1* | 1/2009 | Pettus | G06F 13/385 | 370/463 |
| 2011/0188417 A1* | 8/2011 | Pettus | G06F 13/385 | 370/310 |
| 2014/0348510 A1* | 11/2014 | Davidson | H04B 10/1149 | 398/118 |
| 2015/0263950 A1* | 9/2015 | Janardhanan | H04L 45/586 | 370/392 |

* cited by examiner

*Primary Examiner* — Fayyaz Alam

(74) *Attorney, Agent, or Firm* — McAndrews, Held & Malloy

(57) ABSTRACT

A first spatial crossbar may transmit data to a second spatial crossbar via a first millimeter wave beam between the first spatial crossbar and the second spatial crossbar. The first spatial crossbar may also transmit data to a third spatial crossbar via a second millimeter wave beam between the first spatial crossbar and the second spatial crossbar. The first millimeter wave beam may emanate from the first spatial crossbar at a first angle and be redirected toward the second spatial crossbar by a reflective surface. The second millimeter wave beam may emanate from the first spatial crossbar at a second angle and be redirected toward the third spatial crossbar by a reflective surface. The transmission to the second spatial crossbar may be concurrent with the transmission to the third spatial crossbar.

20 Claims, 9 Drawing Sheets

MILLIMETER WAVE SPATIAL CROSSBAR FOR A MILLIMETER-WAVE-CONNECTED DATA CENTER

PRIORITY CLAIM

This application claims priority to and the benefit of the following application(s), each of which is hereby incorporated herein by reference:

U.S. provisional patent application 61/838,667 titled "Millimeter Wave Spatial Crossbar" filed on Jun. 24, 2013; and U.S. provisional patent application 61/845,840 titled "Millimeter Wave Spatial Crossbar" filed on Jul. 12, 2013.

BACKGROUND

Limitations and disadvantages of conventional approaches to interconnecting servers in a data center will become apparent to one of skill in the art, through comparison of such approaches with some aspects of the present method and system set forth in the remainder of this disclosure with reference to the drawings.

BRIEF SUMMARY

Methods and systems are provided for a millimeter wave spatial crossbar for a millimeter-wave-connected data center, substantially as illustrated by and/or described in connection with at least one of the figures, as set forth more completely in the claims.

DETAILED DESCRIPTION

Figure 1A:
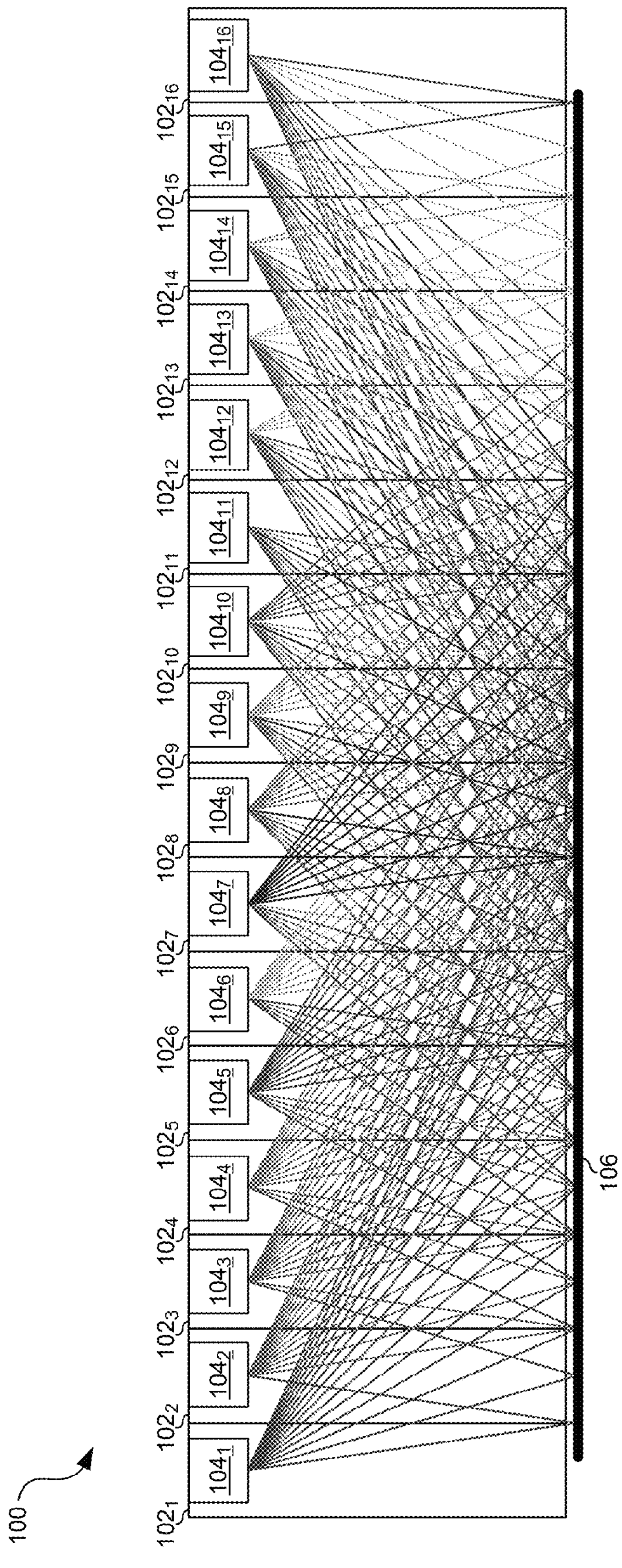
FIG. 1A shows a side view of a group of server racks interconnected via a millimeter wave spatial crossbar, in accordance with an example implementation of this disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Aspects of this disclosure include using millimeter wave links to connect racks (and/or other components) in a data center. The millimeter wave spectrum enables focused radiation beams, and small antenna dish size. The use of millimeter wave links may provide lossless throughput at lower latency than conventional cable-connected data centers, may consume lower power than conventional cable-connected data centers, eliminate physical/spatial issues present with conventional cable-connected data centers, provide for longer reach than copper cabling (e.g., >~150 meters), and may enable simplification of core and edge switches. The use of millimeter wave links in the datacenter may enable flattened rack-to-rack communications instead of multiple tiers of switches; may enable 40 Gbps (or higher) full-duplex links, and may enable direct connections among racks rather than via multiple tiers of Ethernet (or other) switches, which may greatly reduce switch latency. The use of millimeter wave links for interconnecting components of data centers may provide for greater scalability than other approaches. One plane of interconnections (e.g., 222 of FIG. 4D, below) may occupy, for example, only ~10 GHz of millimeter wave spectrum, and the narrow beamwidth may enable frequency reuse at close distances (e.g., planes 220 and 224 of FIG. 2 may use the same band of frequencies). Furthermore, the entire 60-150 GHz range may be usable since it is confined inside the data center and not interfering with third-party communications.

Aspects of this disclosure may enable fast, non-blocking traffic between server racks through use of high-speed rack-to-rack dedicated millimeter wave beams and segregation of inter-rack, intra-rack, and core traffic. The use of millimeter wave links may reduce the small form-factor pluggable (SFP) module and cable count in the data center, which may reduce power consumption by 70% or more. The use of millimeter wave links may enable buffering and routing to servers to be done at rack level, and may provide for guaranteed full-rate, lossless connection between server racks. The use of millimeter wave links may enable pushing routing to the network edge and may make routing more scalable.

FIG. 1A shows a side view of a group of server racks interconnected via a millimeter wave spatial crossbar, in accordance with an example implementation of this disclosure.

Conventionally, inter-rack communications is via one or more packet switches (e.g., a "tier 1" switch) which introduces substantial latency (e.g., 100s of microseconds). The more pairs or racks that are trying to communicate with each other at any given time, the higher the latency. Conventional switches with N ports require a complexity proportional to $N^2$, and also require buffering at the input or output of the switch to accommodate high bandwidth traffic directed at a particular port. Buffering in high speed switches requires memory, queuing, and flow control whose complexity and power consumption increase with switch bandwidth. In addition to these limitations, switch architectures such as hierarchical or Banyan switches need to be routed carefully to avoid blocking.

Figure 1B:
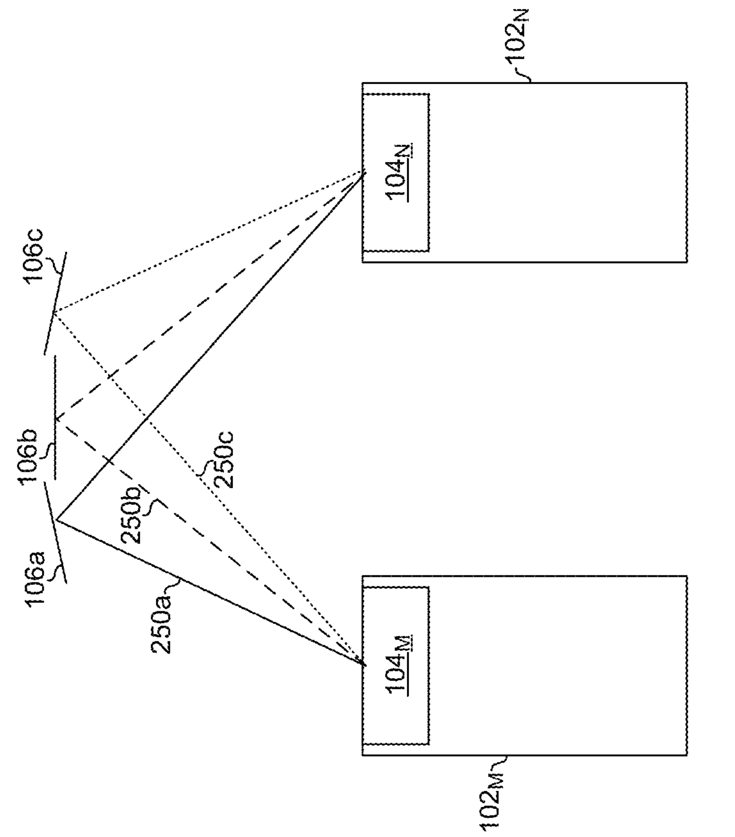
FIG. 1B shows an example surface for reflecting millimeter wave beams in a millimeter-wave-connected datacenter.

Shown is an example group of server racks 100 in a data center. The example group comprises sixteen server racks 102 each of which may house one or more (e.g., up to forty) servers, and each of which comprises a millimeter wave spatial crossbar 104. Inter-rack communications may be via millimeter wave beams sent between pairs of spatial crossbars 104. That is, racks $\mathbf{102}_M$ and $\mathbf{102}_N$ may communicate via millimeter wave beams between spatial crossbars $\mathbf{104}_M$ and $\mathbf{104}_N$ (for the example shown in FIG. 1, each of M and N is an integer between 1 and 16 and M does not equal N). The millimeter wave beams may reflect one or more surfaces 106 located in the vicinity around the group 100 (e.g., one or more metallic surfaces located above, below, to one side, and/or to the other side of the group 100). The reflecting surface(s) 106 may be angled and shaped to optimize link formation and efficiency, and/or minimize crosstalk among links. For example, reflectors may be angled to reduce the range of beam steering required of each spatial crossbar 104. A curved surface may be used to refocus each beam to minimize crosstalk. An example of angled surfaces 106 is shown in FIG. 1B. Similarly, absorbing and blocking surfaces may be placed in, on, and/or around the group 100 to minimize crosstalk between millimeter wave beams and control the emission of millimeter waves to other areas of the data center and/or external to the data center. Any two or more millimeter wave beams may intersect and pass through each other without interference, eliminating the need for a switching element or for inter-rack cables. Each spatial crossbar 104 may be angled, and/or its antenna design optimized for, the range of angles that its corresponding position in the spatial crossbar requires. For example, spatial crossbar $\mathbf{104}_1$, being located at the end of a group 100 arranged as a row, may be configured in a first manner whereas $\mathbf{104}_8$, being in the middle of the group 100 arranged as a row, may be configured in a second manner. Each millimeter wave spatial crossbar 104 of the group 100 may maintain individual inter-rack links with each other spatial crossbar 104 of the group 100. Each inter-rack link may operate at full rate without needing input or output buffering. Traffic into a spatial crossbar $\mathbf{104}_M$ may be presorted based on the rack $\mathbf{102}_N$ to which the traffic is the destined. This presorting may enable efficient implementation of routing functions within the spatial crossbars 104 and allow for faster routing once the payload is delivered to the destination spatial crossbar $\mathbf{104}_N$. The low latency and high bandwidth of each spatial crossbar 104 also enables efficient multi-hop routing through one or more intermediary spatial crossbar 104. This allows increased bandwidth between racks 102. For example, one rack $\mathbf{102}_M$ may communicate to a second rack $\mathbf{102}_N$ by using the direct link between their respective spatial crossbars $\mathbf{104}_M$ and $\mathbf{104}_N$, as well as taking advantage of available link capacity via the spatial crossbar $\mathbf{104}_X$ of a third rack $\mathbf{102}_X$. With a small amount of input buffering, link availability of each spatial crossbar 104 at future times may be easily distributed to other spatial crossbars 104 to allow spatial crossbar routing algorithms to optimize throughput. This distribution can be done on a logical side channel provisioned in the spatial crossbars 104 and/or through conventional IP routing. In this manner, each rack in the group may communicate directly with any other rack in the group via a high bandwidth, low latency link over one or more millimeter wave beams, thus avoiding the latency of the conventional approach of interconnecting racks via packet switches. Furthermore, each of the links may support substantially more bandwidth than conventional Ethernet links. Whereas conventional architectures lead to much redundancy of storage and processing because the latency required for accessing information on another rack is too great, the low latency achieved by interconnecting server racks via millimeter wave spatial crossbars means that more inter-rack communications can occur while still achieving latency targets. This frees up memory and processing power for performing more tasks and thus leads to a more efficient and faster data center overall.

The frequency band(s) used for the millimeter wave communications may be in unlicensed frequency bands but may also (or alternatively) be in licensed bands as a result of the relatively low transmit power needed and the fact that the transmissions are within the closed environment of a data center. The benign conditions of the data center (little or no airborne particulates, no precipitation, temperature controlled, etc.) permit the unrestricted use of contiguous spectrum in the millimeter wave frequency ranges. The relatively short distances and controlled environment reduce both the transmit power and receive sensitivity required to maintain the link budget, allowing higher and/or more absorptive portions of the spectrum to be used by the spatial crossbars 104. Higher portions of the millimeter wave spectrum allow higher gain antennas with smaller physical size, which increases the possible density of spatial crossbars, while also increasing the available bandwidth for transmission. The benign conditions of the data center also allow all circuitry to be integrated in manufacturing processes (e.g. digital CMOS) which are lower cost and often not suitable for high power generation at millimeter wave frequencies. This allows most or all of the circuitry in the spatial crossbar to be integrated in a monolithic implementation (e.g., a single CMOS die). Notwithstanding, the switch may also be partitioned into two or more dies of different manufacturing technologies to optimize the system design. Similarly, the controlled environmental conditions may enable use of frequency band(s) that generally suffer too much atmospheric attenuation to be practical in environments which aren't so precisely controlled. In an example implementation, characteristics (e.g., beamforming, timing, synchronization, frequency, etc.) of the millimeter wave links may be autoconfigured based on a priori knowledge of switch geometry.

Figure 2:
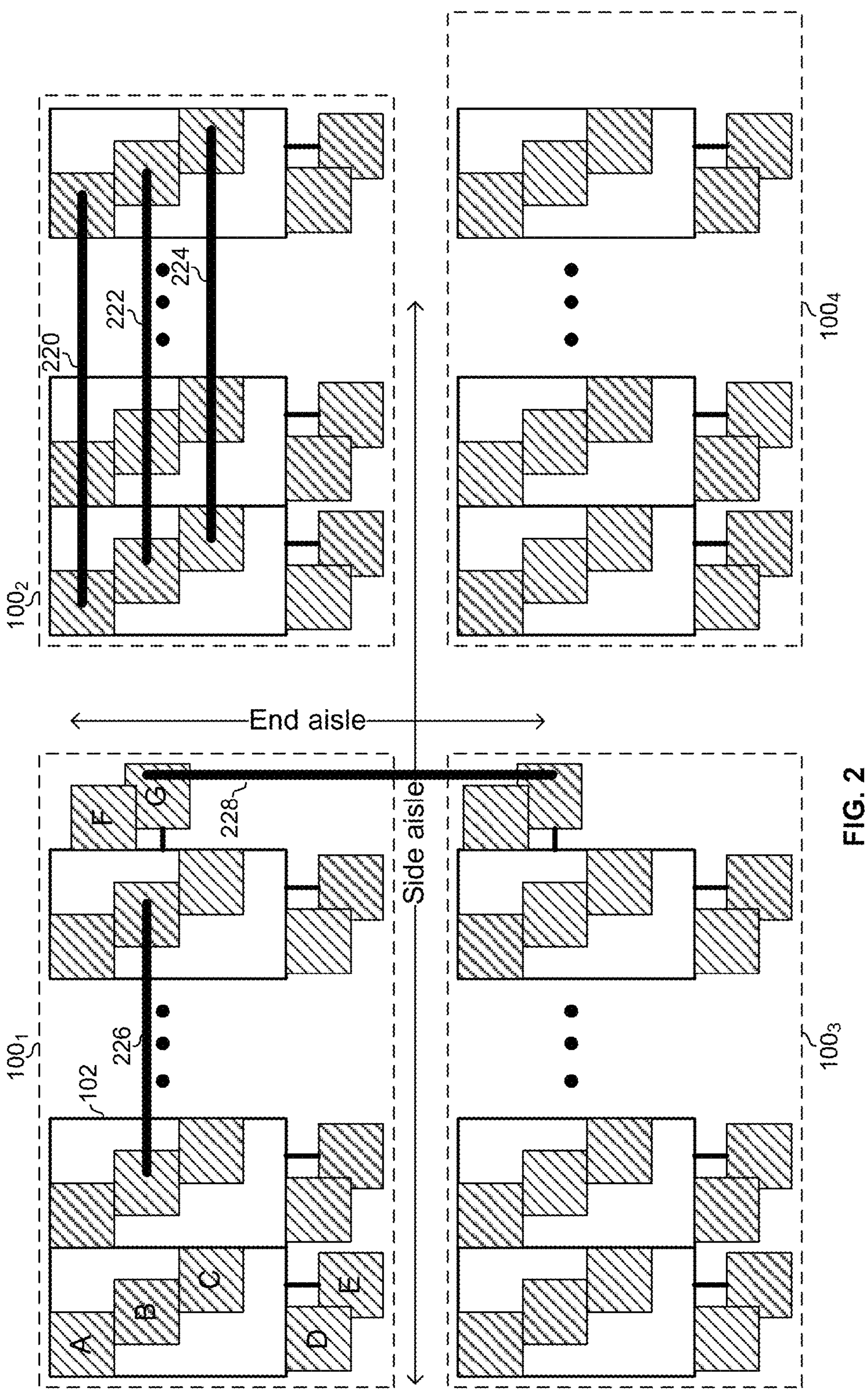
FIG. 2 shows a top (or bottom) view of several groups of server racks each of which comprises one or more spatial crossbars operable to communicate using millimeter wave spatial mutliplexing, in accordance with an example implementation of this disclosure.

FIG. 2 shows a top (or bottom) view of several groups 100 of server racks 102 each of which comprises one or more spatial crossbars 104 operable to communicate using millimeter wave spatial multiplexing, in accordance with an example implementation of this disclosure. In FIG. 2, the hashed boxes depict example mounting positions for lenses or reflectors of the spatial crossbars 104 to enable communications via millimeter wave beams propagating between racks 102 of a particular group 100 and between racks 102 of different groups 100. As can be seen the lenses or reflectors may be positioned within the boundaries of the racks 102 or may extend into the side and/or end aisles between racks 102. For example, lens positions A, B, and C are within the lateral boundaries of the rack, positions D and E extend into a side aisle, and positions F and G extend into an end aisle. Spatial crossbars 100 at different ones of the positions A-G may operate in the same millimeter wave frequency bands, or they may be allocated different millimeter wave frequency bands. Additionally, positions extending into the aisles may include multiple positions having various heights. In this manner, each of the x (left to right on the drawing sheet), y (top to bottom on the drawing sheet), and z (into and out of the drawing sheet) dimensions may be used for staggering lenses or reflectors to provide increased spatial multiplexing (i.e., to provide many direct and/or reflection lines of sight along which the millimeter wave beams may propagate among servers in a rack, servers in different racks, racks in a group, and/or racks in different groups).

In an example implementation, there may be one millimeter wave spatial crossbar 104 per rack 102. In another example implementation, there may be multiple spatial crossbars 104 per rack 102, with each spatial crossbar 104 serving a subset of one or more servers of the rack 102. In an example implementation, redundant spatial crossbars per rack 102 may be used for multiple spatial routing planes for increased capacity. For example, the lines 220, 222, and 224 in FIG. 2 may correspond to five switching planes that operate concurrently. This may be possible as a result of the narrow beamwidth of the millimeter wave beams and/or interference cancellation techniques implemented in the spatial crossbars. The redundant spatial routing planes may be used to implement redundant connectivity and enable failover in the event of a failure. The spatial routing plane 226 illustrates a plane that is aligned with the plane 222 but the two do not interfere with each other because of the tightly controlled radiation patterns (and there may additionally be a blocker, absorber, etc.). The plane 228 illustrates an example plane that traverses the side aisle.

Figure 3:
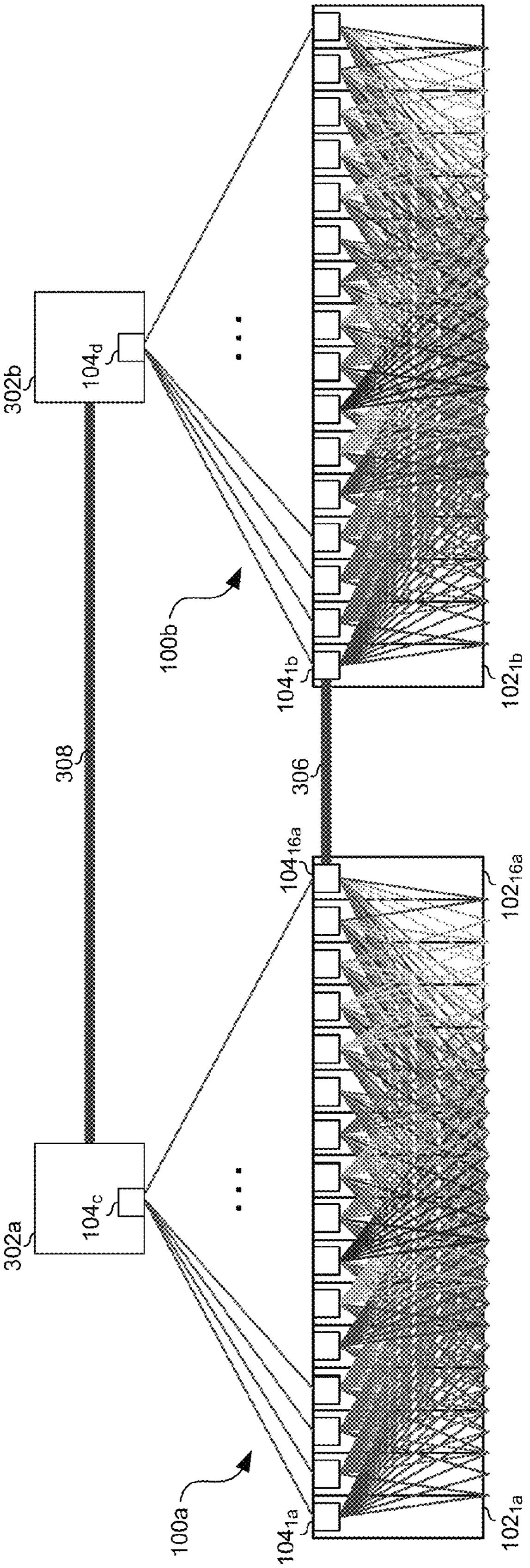
FIG. 3 shows example interconnections between two groups of server racks.

FIG. 3 shows example interconnections between two groups of server racks. FIG. 3 depicts that inter-group communications between group 100*a* and 100*b* may be between rack-mounted spatial crossbars 104 (e.g., between $\mathbf{104}_{16}$ of group 1 and $\mathbf{104}_1$ of group 2) and/or via hierarchical switches 302*a* and 302*b*.

For inter-group communications via the rack-mounted crossbars $\mathbf{104}_{16a}$ and $\mathbf{104}_{1b}$, the inter-group link 306 may comprise one or more millimeter wave beams. For inter-group communications via hierarchical switches 302*a* and 302, the crossbars $\mathbf{104}_{1a}$-$\mathbf{104}_{16a}$ may establish millimeter wave links with crossbar 104*c* of switch 302*a* and the crossbars $\mathbf{104}_{1b}$-$\mathbf{104}_{16b}$ may establish millimeter wave links with spatial crossbar 104*d* of switch 302*a*, and then the switches 302*a* and 302*b* communicate via link 308 which may comprise one or more millimeter wave beams, optical cables, and/or fiber cables.

Because of the low power and narrow beamwidth of the millimeter wave beams, interference between different groups of racks may be minimal and therefore frequency reuse may be employed on a per-rack basis, for example. Such frequency reuse may be highly beneficial for simplicity of building and scaling the data center. Nevertheless, in some instances certain millimeter wave links may use different frequency bands than other millimeter wave links in order to mitigate interference. Racks, or groups of racks may be simultaneously be connected by fiber links and their associated switches such that a hybrid network of millimeter wave and fiber may be constructed.

Figure 4A:
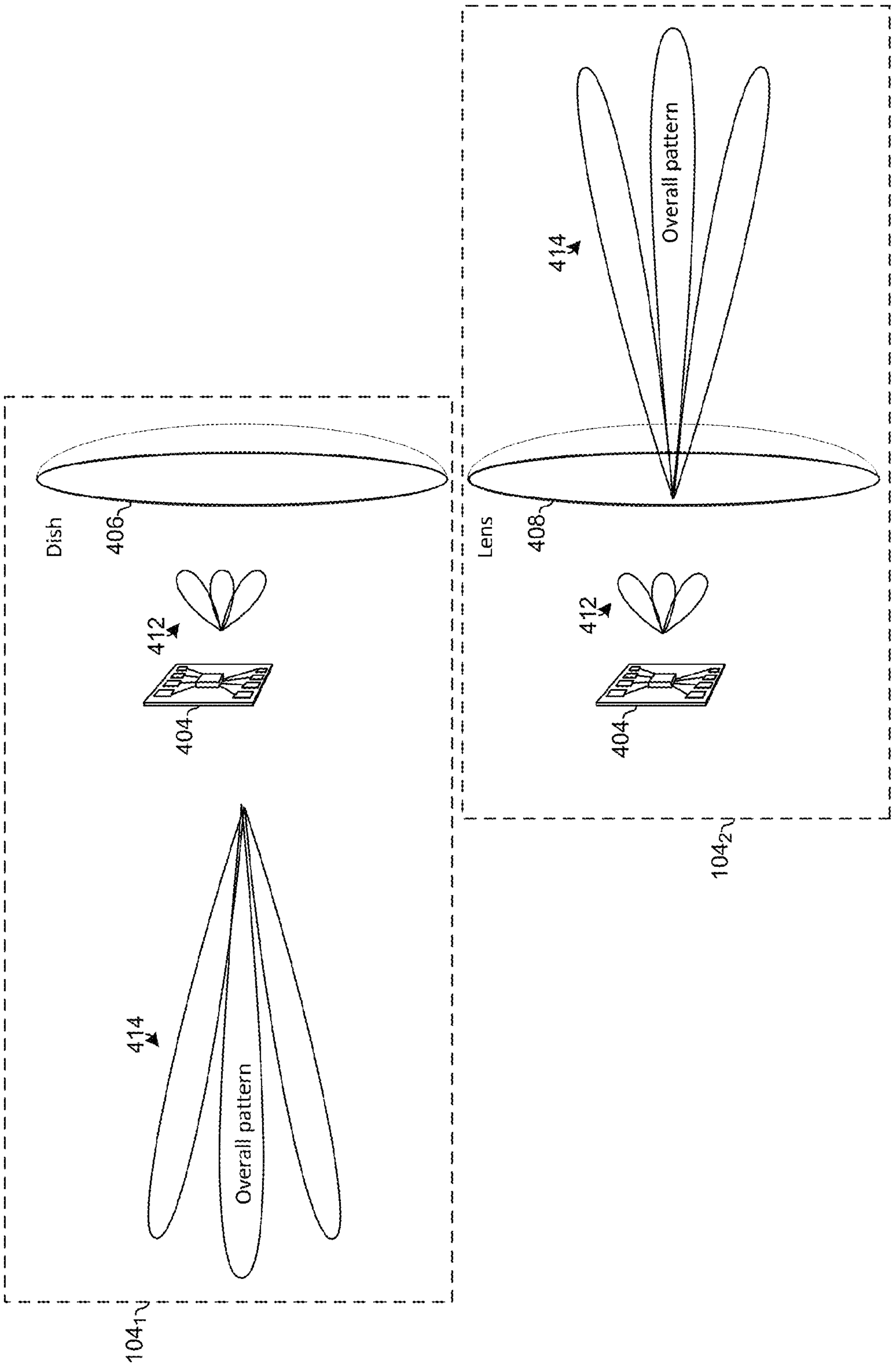
FIG. 4A shows two example implementations of a millimeter wave spatial crossbar.

FIG. 4A shows two example implementations of a millimeter wave spatial crossbar. The first implementation $\mathbf{104}_1$ in FIG. 4A comprises circuitry 404 and a reflector 406. The second implementation $\mathbf{104}_2$ in FIG. 4A comprises the circuitry 404 and a lens 408. Example implementations of the circuit 404 are described below with reference to FIGS. 4B and 4C.

Whether the implementation $\mathbf{104}_1$ or $\mathbf{104}_2$ is chosen for any particular rack 102 may depend on the distances to be covered by the millimeter wave beams, the geometry of the room/racks/servers/etc. in the data center, the layout of the data center, the cost of the lens vs. the reflector, and/or the like. In an example implementation, the size of a racks 102 in which the spatial crossbars $\mathbf{104}_1$ and $\mathbf{104}_2$ are housed may be sufficiently large that they can accommodate a lens or reflector diameter of a foot or more. This may enable very narrow millimeter wave beams. Additionally, the distances to be covered by the millimeter wave beams combined with the favorable and highly controlled environmental conditions in the data center may allow the beams to be very low power. Such conditions may make using the lens-type spatial crossbar $\mathbf{104}_2$ feasible. That is, while the lens 408 is typically more lossy and costly than a comparable reflector 406, here less expensive materials with higher loss may be tolerable due to the low power, environmentally controlled application. The lens may be, for example, cylindrically shaped to support multiple beams in a plane such as the planes 220, 222, 224 in FIG. 2.

For transmit functions, the circuitry 404 outputs a radiation pattern 412 which is altered by reflector 406 or lens 408 to result in a millimeter wave beam pattern 414 comprising M highly-focused beams/lobes at desired directions/angles corresponding to the spatial crossbar link partners.

Figure 4B:
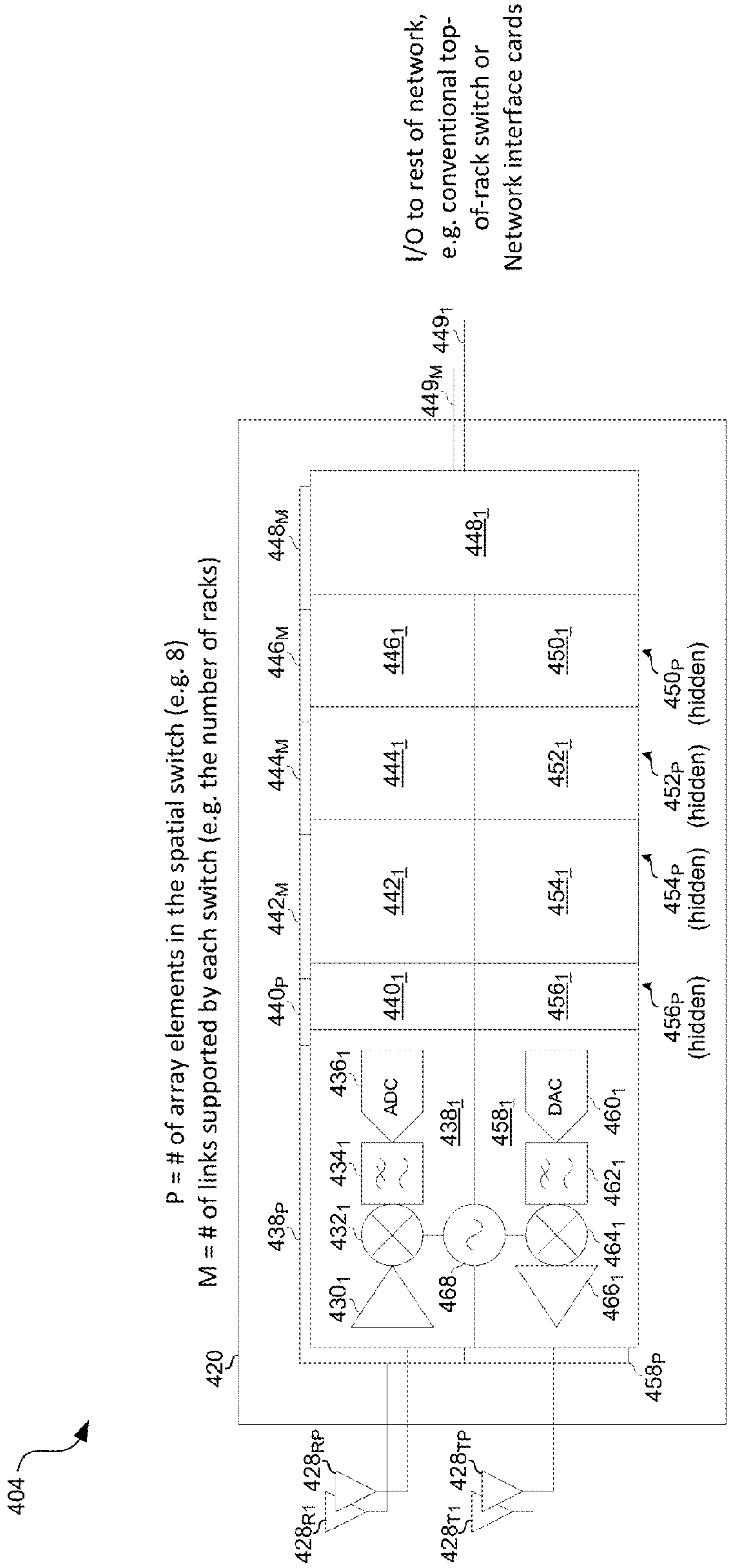
FIG. 4B shows a first example implementation of circuitry of a millimeter wave spatial crossbar.

FIG. 4B shows an example implementation of circuitry of a millimeter wave spatial crossbar. In FIG. 4B, P is a positive integer corresponding to the number of antenna elements used for each of transmit and receive functions by the spatial crossbar and M is a positive integer corresponding to the number of transmit millimeter wave beams and the number of receive millimeter wave beams. The circuitry comprises a first phased array antenna comprising P (a positive integer) antenna elements $\mathbf{428}_{R1}$-$\mathbf{428}_{RP}$, a second phased array antenna comprising P antenna elements $\mathbf{428}_{T1}$-$\mathbf{428}_{TP}$, and a circuit assembly 420. The circuitry 420 comprises P receive analog front-ends 408, P receive filters 440, M receive beamforming circuits 442, M demodulators 444, M decoders 446, M spatial crossbar input/output circuits 448, M encoders 450, M modulators 452, M transmit beamforming circuits 454, P transmit filters 456, P transmit analog front-ends 458, and a local oscillator 468. Each receive front-end 438 comprises a low noise amplifier 430, a mixer 432, a filter 434, and an analog-to-digital converter 436. Each transmit front-end 458 comprises a digital-to-analog converter 460, a filter 462, a mixer 464, and a power amplifier 466.

For receive functions, the multiple spatially multiplexed beams may be collected via the lens 408 (FIG. 4A) or reflector 406 (FIG. 4A) onto the antenna elements $\mathbf{428}_{R1}$-$\mathbf{428}_{RP}$. Each element $\mathbf{428}_{Rp}$ ($1 \le p \le P$) may output a millimeter wave signal to a respective receive front-ends $\mathbf{438}_p$. In the receive front-end $\mathbf{438}_p$, the signal is amplified by $\mathbf{430}_p$, downconverted by mixer $\mathbf{432}_p$ based on the output of the LO 468, filtered by filter $\mathbf{434}_p$ to remove undesired mixing products, and then converted to a digital representation by ADC $\mathbf{436}_p$. The digital signal is then filtered by filter 440*p* and conveyed to each of the receive beamforming circuits $\mathbf{442}_1$-$\mathbf{442}_M$. Each of the beamforming circuits then performs amplitude weighting, phase shifting, and combining of the P signals to recover a signal corresponding to a respective one of M millimeter wave beams incident on the antenna elements $\mathbf{428}_{R1}$-$\mathbf{428}_{RP}$. Each beamforming circuit $\mathbf{442}_m$ ($1 \le m \le M$) then conveys its signal to demodulator $\mathbf{444}_m$. Demodulator $\mathbf{444}_m$ performs symbol demapping, deinterleaving, and/or other demodulation operations to recover forward error correction (FEC) codewords carried in the corresponding millimeter wave beam, and outputs the data to the decoder $446_m$. Decoder $446_m$ performs decoding in accordance with a selected forward error correction decoding algorithm to recover data bits from the FEC codewords, and conveys the bits to I/O circuitry $448_m$. The I/O circuitry 448*m* then outputs the data on link $449_m$ to other circuitry or components (e.g., to a top-of-rack switch of the rack 102 in which the circuitry 404 resides, to one or more servers 102 in which the circuitry 404 resides, to a hierarchical switch such as 302*a* (FIG. 3), and/or the like).

For transmit functions, each of M datastreams (e.g., presorted and destined for M racks) may arrive at a respective one of the I/O circuits $448_1$-$448_M$. For each datastream, the corresponding I/O circuitry $448_m$ performs whatever processing necessary (e.g., amplification, frequency conversion, filtering, encapsulation, decapsulation, and/or the like) to recover the data from the link $449_m$ and condition the data for conveyance to encoder $450_m$. Each encoder $450_m$ receives data bits from I/O interface $448_m$ and generates corresponding FEC codewords in accordance with a selected FEC encoding algorithm. Each encoder $450_m$ then conveys the FEC codewords to modulator $452_m$. The modulator $452_m$ modulates the FEC codeword in accordance with a selected modulation scheme and outputs the modulated signal to each of beamforming circuits $456_1$-$456_P$. Each beamforming circuit $456_p$ performs amplitude weighting, phase shifting, and combining of the M signals to generate P signals that, when transmitted via the antenna elements $428_{T1}$-$428_{TP}$ will result in M beams, each of the M beams carrying a respective one of the M signals from the modulators $452_1$-$452_M$ and each of the beams being at an angle determined based on the location of the server rack (or other network component comprising a spatial crossbar) to which it is destined. Each of the P signals from the beamforming circuits $454_1$-$454_P$ is processed by a respective one of transmit front-ends $458_1$-$458_P$. This processing may include digital-to-analog conversion, anti-aliasing filtering via filter 462*p*, upconversion to millimeter wave frequency band via mixer 464*p* and LO 468, and amplification via power amplifier $466_p$. The output of each PA 466*p* is conveyed to an antenna element $428_p$ which radiates the millimeter wave signal.

In an example implementation the circuit assembly 420 comprises one or more semiconductor die(s) along with one or more discrete components (resistors, capacitors, and/or the like), on a printed circuit board. In an example implementation, the circuitry 420 may be realized entirely using a CMOS process (i.e., no need for GaAs, InP, or other special processes for a power amp or low noise amplifier) due to the low power requirements and high link budget resulting from the short distances and tightly controlled environment of the data center. In an example implementation, the antenna elements $428_{R1}$-$428_{RP}$ and $428_{T1}$-$428_{TP}$ may comprise microstrip patch antennas integrated on a common PCB with the other components of the circuit assembly 420. The lens may have an anti-reflective coating so as to reduce reflection of transmitted signals back onto the antenna elements $428_{R1}$-$428_{RP}$.

Figure 4C:
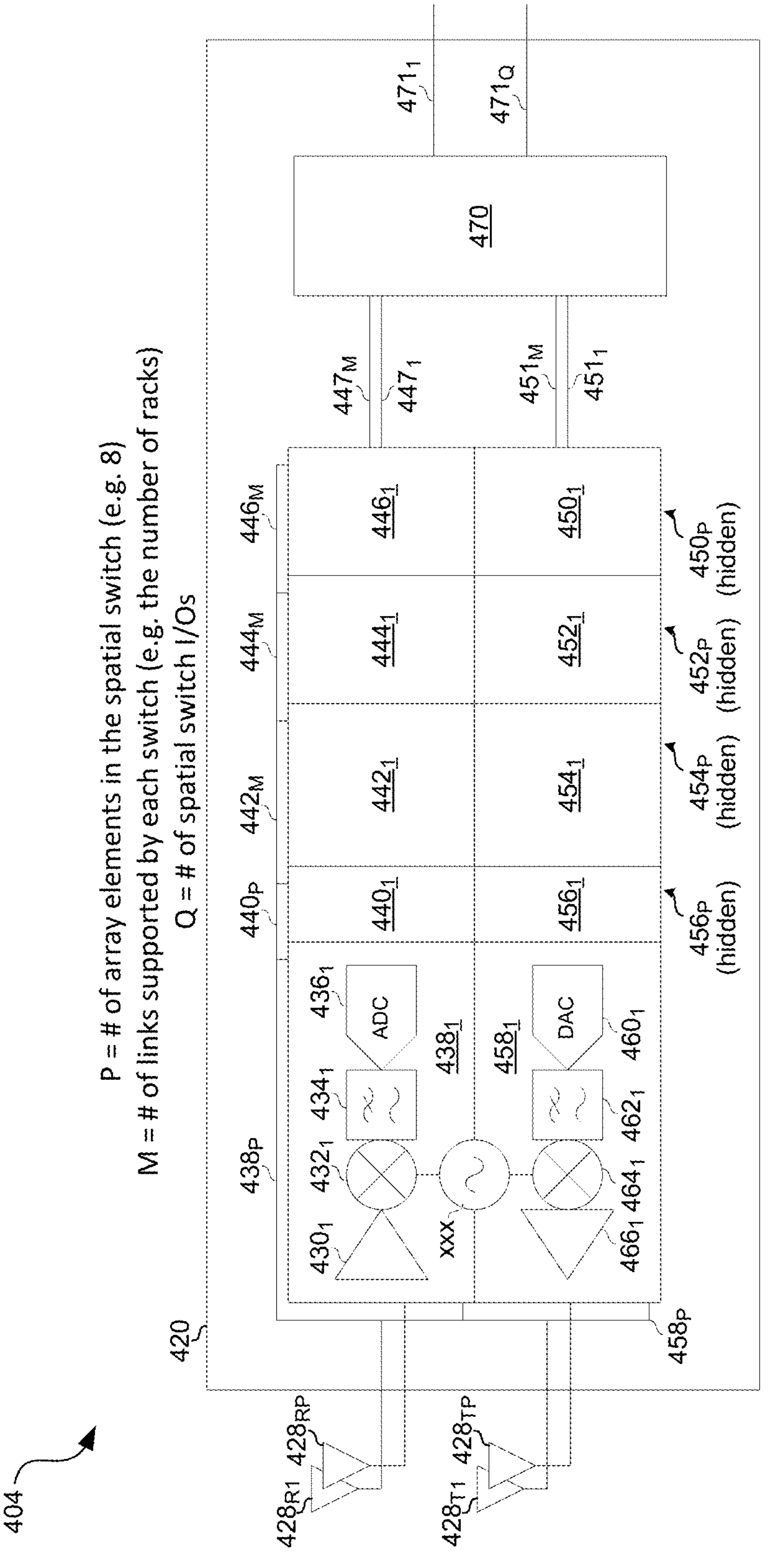
FIG. 4C shows a second example implementation of circuitry of a millimeter wave spatial crossbar.

FIG. 4C shows a second example implementation of circuitry of a millimeter wave spatial crossbar. The implementation of FIG. 4C is similar to the implementation of FIG. 4B, except that the I/O circuits $448_1$-$448_M$ are replaced by a packet inspection and routing circuit 470. The packet inspection and routing circuit 470 is operable to route traffic to and/or from Q network ports, where Q is a positive integer. The circuit 470 may implement routing protocols that provide for multi-hop routing, which may enable higher transmit burst rates and improved link utilization (e.g., traffic offloaded from a single-hop link comprising a single millimeter wave beam to a two-hop link comprising two millimeter wave beams via an intermediary spatial crossbar). Low PHY latency may reduce the penalty for implementing such routing. Routing table updates may be handled by a side channel (e.g., via a millimeter wave beam and/or a cable). In an example implementation, buffering and flow control may be handled by the circuitry 470 or may be handled by the circuitry/components on the other end of links $471_1$-$461_Q$ (e.g., a top-of-rack switch).

Figure 5A:
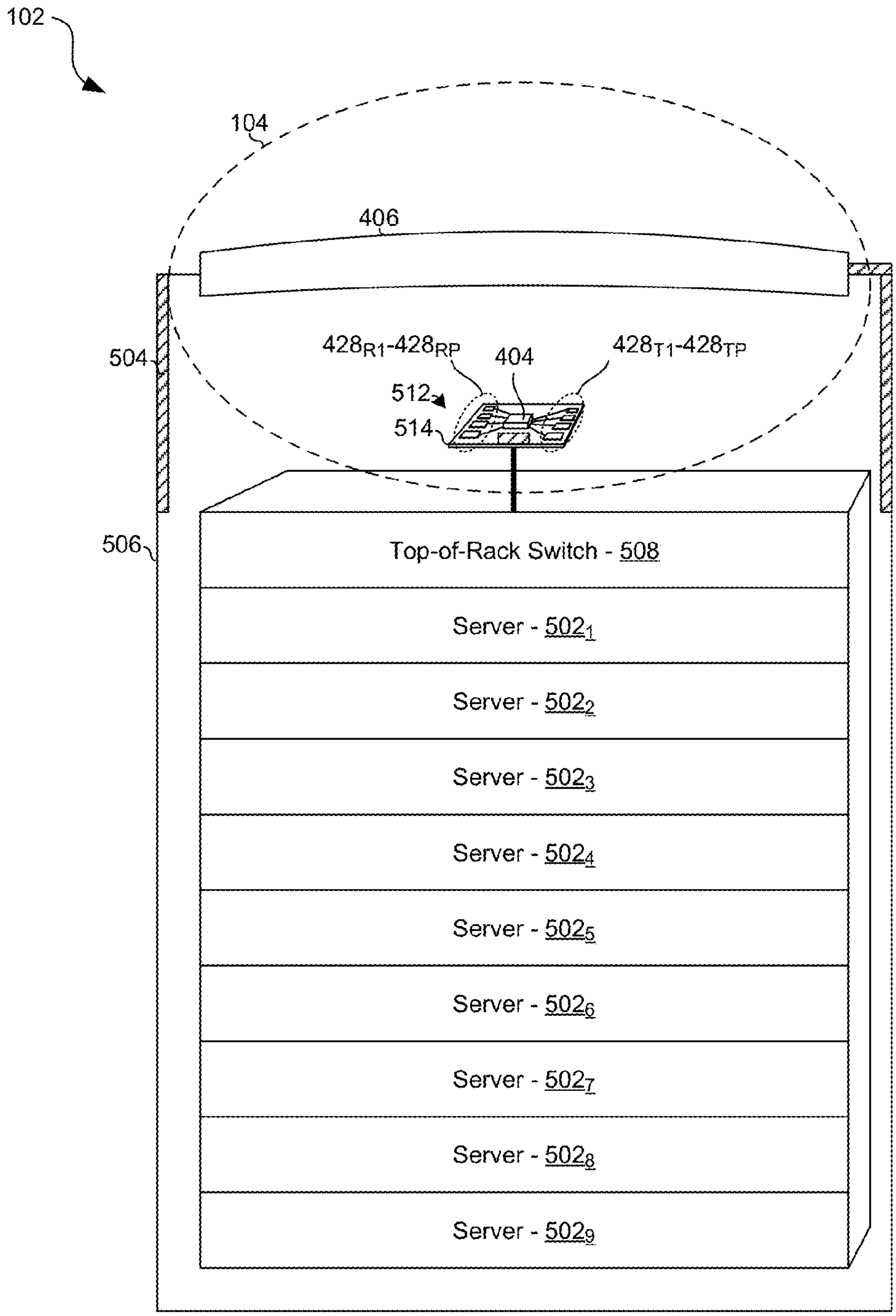
FIG. 5A shows an example server rack comprising a plurality of servers and a spatial crossbar.

FIG. 5A shows an example server rack comprising a plurality of servers and a spatial crossbar. The example rack 102 of FIG. 5A comprises outer walls 506 and houses nine servers 502, a top-of-rack (TOR) switch 508, and a spatial crossbar 104 comprising circuitry 512 and lens 406. The circuitry 512 comprises PCB 514, chip 404 as described above, antenna array $428_{R1}$-$428_{RP}$ and antenna array $428_{T1}$-$428_{TP}$. In the example rack shown, the lens 406 is mounted to a top wall of the rack 102 such that the circuitry 404 is enclosed within the rack 102 and millimeter wave beams exit the rack through the lens 406. In other implementations, the lens, or additional lenses, may be mounted to side wall(s) and/or bottom wall(s) of the rack 102. The lens 406 may be made of a plastic or other dielectric material. The lens 406 may be, for example, cylindrically shaped to support multiple beams in a plane such as the planes 220 and 222 in FIG. 2. The lens may have an anti-reflective coating so as to reduce reflection of transmitted signals back onto the antennas $428_{R1}$-$428_{RP}$.

The servers 502 may each connect to the switch 330 via, for example, copper cables or a backplane. The TOR switch 330 may communicate with the spatial crossbar 104 via one or more links 331 which may be copper or fiber, for example.

In an example implementation, surfaces (e.g., inside and/or outside surfaces of the walls 506 and surfaces of the circuitry 404 other than the antenna elements) may be coated with millimeter-wave-absorbent materials 504 (indicated by hashed lines in FIG. 5A) so as to reduce reflections. Similarly, surfaces of the rack, circuitry 304, and/or other components of the data system may be shaped so as to reduce the impact of reflections within the rack 102 and external to the rack 102 within the data center.

Figure 5B:
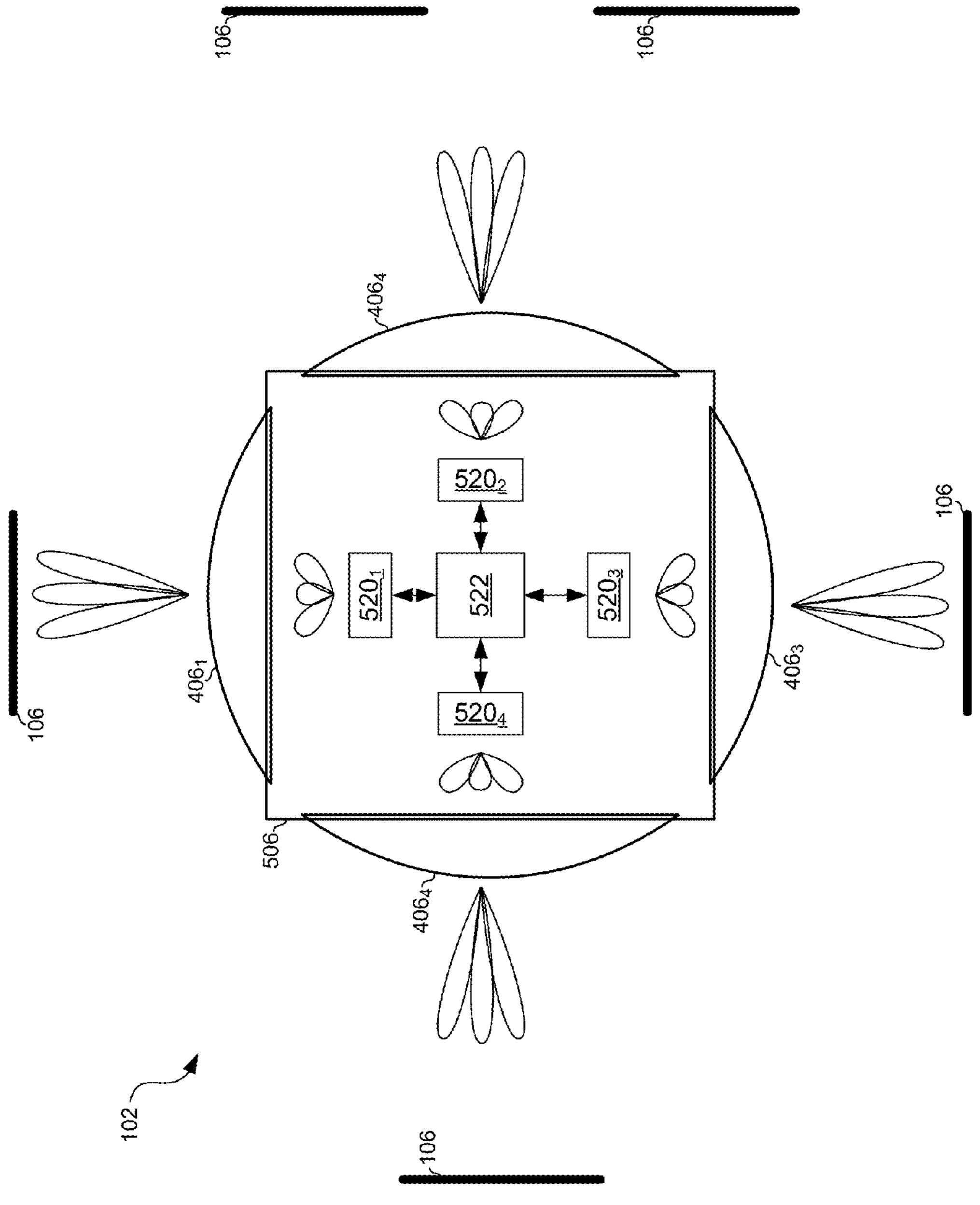
FIG. 5B shows an example server rack comprising multiple lenses for millimeter wave communications over a wide range of angles.

FIG. 5B shows an example server rack comprising multiple lenses for millimeter wave communications over a wide range of angles. Shown is a top view of a rack 102 which comprises a single spatial crossbar supporting four lenses 406. The lenses 406 are mounted to each side wall of the server rack 102. There is a corresponding plurality of phased array antennas 520 arranged such that each transmits and/or receives via a respective one of the lenses. Each of the antennas may comprise a plurality of antenna elements such as $428_{T1}$-$428_{TP}$ for transmit functions and/or a plurality of antenna elements such as $428_{R1}$-$428_{RP}$ for receive functions.

The circuitry 522 in FIG. 5B may be similar to the circuitry 420, for example. In one example implementation, the circuitry 522 may support eight phased array antennas for concurrent full-duplex communications via each of the lenses $406_1$-$406_4$. In an example implementation, the circuitry 522 may support less than eight phased array antennas and may be configured to dynamically select the phased array antennas 520 via which it desires to transmit and/or receive at any given time.

In accordance with an example implementation of this disclosure, a first spatial crossbar (e.g., $104_1$ of FIG. 1) may transmit data to a second spatial crossbar (e.g., $104_2$ of FIG. 1) via a first millimeter wave beam between the first spatial crossbar and the second spatial crossbar. The first spatial crossbar may also transmit data to a third spatial crossbar (e.g., 104$_{16}$) via a second millimeter wave beam between the first spatial crossbar and the second spatial crossbar. The first millimeter wave beam may emanate from the first spatial crossbar at a first angle and be redirected toward the second spatial crossbar by a reflective surface (e.g., 106 of FIG. 1A or 106$_1$ of FIG. 1B). The second millimeter wave beam may emanate from the first spatial crossbar at a second angle and be redirected toward the third spatial crossbar by a reflective surface (e.g., 106 of FIG. 1A or 106$_2$ of FIG. 1B). The transmission to the second spatial crossbar may be concurrent with the transmission to the third spatial crossbar. The first spatial crossbar may be housed by a first server rack (e.g., 102$_1$ of FIG. 1A) which may also house a first server (e.g., 502$_1$). The first spatial crossbar may receive the data from the first server via a wired or fiber link. The first server rack may house a top-of-rack switch (e.g., 508). The first spatial crossbar may receive the data from the top-of-rack switch via a wired or fiber link. The first spatial crossbar may comprise a lens (e.g., 406) that is mounted to a wall (e.g., 506) of the server rack. The first millimeter wave beam and the second millimeter wave beam may pass through the lens. The first server rack, the second server rack, and the third server rack may be arranged in a row of racks (e.g., as shown in FIG. 1A). The first spatial crossbar may comprise a lens mounted to a top wall of the first server rack, and the reflective surface may be above the row of racks. The first spatial crossbar may comprise a lens mounted to a side wall of the first server rack, and the reflective surface may be to the side of the row of racks. The first spatial crossbar may comprise a lens mounted to a bottom wall of the first server rack, and the reflective surface may be below the row of racks. The first spatial crossbar may receive data from the second spatial crossbar via a third millimeter wave beam between the first spatial crossbar and the second spatial crossbar. The first spatial crossbar may receive data from the third spatial crossbar via a fourth millimeter wave beam between the first spatial crossbar and the second spatial crossbar. The third millimeter wave beam may be incident on the first spatial crossbar at the first angle. The fourth millimeter wave beam may be incident on the first spatial crossbar at the second angle. The reception of the data from the second spatial crossbar may be concurrent with the reception of the data from the third spatial crossbar.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:

in a data center comprising a first server rack housing a first spatial crossbar, a second server rack housing a second spatial crossbar, and a third server rack housing a third spatial crossbar, performing by said first spatial crossbar:

transmitting data to said second spatial crossbar via a first millimeter wave beam between said first spatial crossbar and said second spatial crossbar; and transmitting data to said third spatial crossbar via a second millimeter wave beam between said first spatial crossbar and said third spatial crossbar, wherein:

said first millimeter wave beam emanates from said first spatial crossbar at a first angle and is redirected toward said second spatial crossbar by a reflective surface in said data center;

said second millimeter wave beam emanates from said first spatial crossbar at a second angle and is redirected toward said third spatial crossbar by a reflective surface in said data center;

said transmitting to said second spatial crossbar is concurrent with said transmitting to said third spatial crossbar.

2. The method of claim 1, wherein:

said first server rack houses a first server; and said method comprises receiving said data from said first server via a wired or fiber link.

3. The method of claim 1, wherein:

said first server rack houses a top-of-rack switch; and said method comprises receiving said data from said top-of-rack switch via a wired or fiber link.

4. The method of claim 1, wherein:

said first spatial crossbar comprises a lens that is mounted to a wall of said server rack; and said first millimeter wave beam and said second millimeter wave beam pass through said lens.

5. The method of claim 1, wherein said first server rack, said second server rack, and said third server rack are arranged in a row of racks in said data center.

6. The method of claim 5, wherein;

said first spatial crossbar comprises a lens mounted to a top wall of said first server rack; and said reflective surface is above said row of racks.

7. The method of claim 5, wherein;

said first spatial crossbar comprises a lens mounted to a side wall of said first server rack; and said reflective surface is to the side of said row of racks.

8. The method of claim 5, wherein;

said first spatial crossbar comprises a lens mounted to a bottom wall of said first server rack; and said reflective surface is to below said row of racks.

9. The method of claim 1, comprising receiving data from said second spatial crossbar via a third millimeter wave beam between said first spatial crossbar and said second spatial crossbar.

10. The method of claim 9, comprising receiving data from said third spatial crossbar via a fourth millimeter wave beam between said first spatial crossbar and said second spatial crossbar, wherein:

said third millimeter wave beam is incident on said first spatial crossbar at said first angle;

said fourth millimeter wave beam is incident on said first spatial crossbar at said second angle;

said reception of said data from said second spatial crossbar is concurrent with said reception of said data from said third spatial crossbar.

11. A system comprising:

a first spatial crossbar for use in a first server rack, said first spatial crossbar being operable to:

transmit data to a second spatial crossbar of a second server rack via a first millimeter wave beam between said first spatial crossbar and said second spatial crossbar; and transmit data to a third spatial crossbar of a third server rack via a second millimeter wave beam between said first spatial crossbar and said third spatial crossbar, wherein:

said first millimeter wave beam emanates from said first spatial crossbar at a first angle and is redirected toward said second spatial crossbar by a reflective surface in said data center;

said second millimeter wave beam emanates from said first spatial crossbar at a second angle and is redirected toward said third spatial crossbar by a reflective surface in said data center;

said transmission to said second spatial crossbar is concurrent with said transmission to said third spatial crossbar.

12. The system of claim 11, wherein:

said first server rack houses a first server; and said first spatial crossbar is operable to receive said data from said first server via a wired or fiber link.

13. The system of claim 11, wherein:

said first server rack houses a top-of-rack switch; and said first spatial crossbar is operable to receive said data from said top-of-rack switch via a wired or fiber link.

14. The system of claim 11, wherein:

said first spatial crossbar comprises a lens that is mounted to a wall of said first server rack; and said first millimeter wave beam and said second millimeter wave beam pass through said lens.

15. The system of claim 11, wherein said first server rack, said second server rack, and said third server rack are arranged in a row of racks in a data center.

16. The system of claim 15, wherein;

said first spatial crossbar comprises a lens mounted to a top wall of said first server rack; and said reflective surface is above said row of racks.

17. The system of claim 15, wherein;

said first spatial crossbar comprises a lens mounted to a side wall of said first server rack; and said reflective surface is to the side of said row of racks.

18. The system of claim 15, wherein;

said first spatial crossbar comprises a lens mounted to a bottom wall of said first server rack; and said reflective surface is to below said row of racks.

19. The system of claim 11, wherein said first spatial crossbar is operable to receive data from said second spatial crossbar via a third millimeter wave beam between said first spatial crossbar and said second spatial crossbar.

20. The system of claim 19, said first spatial crossbar is operable to receive data from said third spatial crossbar via a fourth millimeter wave beam between said first spatial crossbar and said second spatial crossbar, wherein:

said third millimeter wave beam is incident on said first spatial crossbar at said first angle;

said fourth millimeter wave beam is incident on said first spatial crossbar at said second angle;

said reception of said data from said second spatial crossbar is concurrent with said reception of said data from said third spatial crossbar.

* * * * *